F. Gutzkow.
Alcohol Still.
No. 103,604. Patented May 31, 1870.
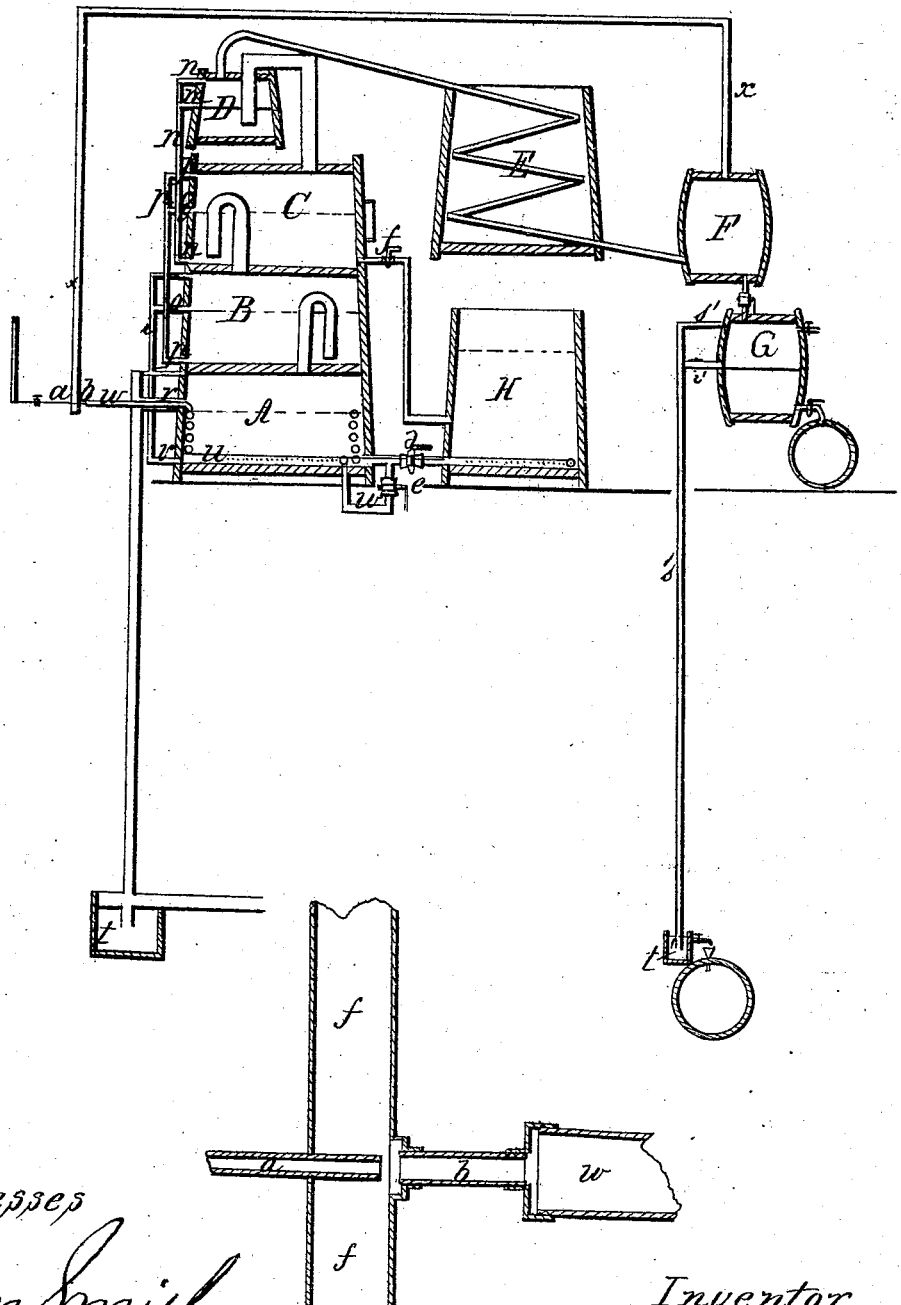
Witnesses
C. W. M. Smith
Thos. Johnston
Inventor
Frederic Gutzkow

United States Patent Office.

FREDERIC GUTZKOW, OF SAN FRANCISCO, CALIFORNIA.

Letters Patent No. 103,604, dated May 31, 1870.

IMPROVED METHOD OF DISTILLING IN VACUO.

The Schedule referred to in these Letters Patent and making part of the same

*To all whom it may concern:*

Be it known that I, FREDERIC GUTZKOW, of the city and county of San Francisco, State of California, have invented certain new and useful Improvements in the Method of Distillation or Evaporation *in vacuo*; and I do hereby declare that the following is a full, clear, and exact description of the same, reference being had to the accompanying drawing and to the letters marked thereon.

The nature of my invention consists of certain details or improvements by which the steam which is required to supply the caloric in a closed vesssel is caused to produce a more or less complete vacuum in the same closed vessel.

In the drawing the figure represented is a vertical sectional elevation of a still, having my improvements.

To enable others skilled in the art or science to which it most nearly appertains to make and use my invention, I will proceed to describe fully its construction and operation.

A B C represent the different compartments of an ordinary still employed for the distillation of spirits from the malt, and heated by steam.

It will be observed that—

A is the lowest compartment, and into which the steams enters.

D is a doubler, and

E an ordinary worm condenser, and the spirit condensed in E runs into the reservoir F, and collects in the barrel G.

H is the reservoir for the cold wash which supplies the chamber C.

The whole apparatus is to be practically air-tight, and strong enough to withstand the vacuum in the interior.

In distilling spirits in a still of this description, by the ordinary method, the steam from the liquid in A would, as F, communicate with the atmosphere, have to overcome the pressure of the atmosphere, added to the pressure exercised by the liquid columns in B C and D.

In the improvement claimed by me, in chamber F is in communication, by the pipe $x$, and the short and narrow pipe $b$, with the steam-pipe $w$, which heats the still, and the steam entering from the nozzle $a$, and expanding into the pipe $b$, overcomes the atmospheric pressure on the area of $b$, and produces a continuous vacuum in $x$.

The pipe $b$ ought to be as short as possible; in fact, may be a mere ring laid in the opening of the larger steam-pipe $w$.

More important than the length of this pipe $b$ is its diameter, for obtaining the desired vacuum in $x$.

This diameter has to be in close proportion to the pressure and weight of the steam issuing from the orifice $a$, and may be found by the following formula:

$$x \div B = 15 \div j$$

where $x$ means the area of the steam-pipe, $a$, B that of the pipe, $b$ and $j$ the pressure of the steam in $a$, over the atmosphere, expressed by pounds avoirdupois per one square inch.

If the pipe $b$ is constructed by this formula, the alcoholic vapor in $x$ will rush into the vacuum formed in $b$ in the same manner as if the piston of an air-pump of the area B is continuously moving forward in $b$ with the velocity of about one thousand feet per second.

The steam mixed with the vapor will pass through the coil $w$ in A, and discharge through a perforated pipe either into the same still A, or into the open reservoir H, or another still or reservoir, where its remaining caloric, and its percentage in alcohol, can be advantageously employed.

If $w$ discharges into A, and the weight of the fluid columns in the apparatus A B C D is equal to six inches mercury, a manometer placed in A will show a vacuum of about twenty-three inches of mercury within the still A.

The still shown in the drawing works continuously, that is, the spent wash and the finished spirit flow in a continuous stream into the atmosphere.

The following description will explain the manner how it is performed:

Steam is turned on in $a$, the stop-cocks $d$ and $f$ are open, all the other stop-cocks are closed. The cold wash will flow through $f$ into $c$ as soon as the desired vacuum is reached, fill $c$, overflow through $g$ and $p$ into B, through $o$ and $l$ into A.

When a water-guage in A shows that the proper level is reached $f$ is closed, and when a manometer in A shows that the proper vacuum exists $d$ is closed and $e$ opened.

The only attention requisite of this apparatus hereafter is the regulating of the water-level in $c$ by the stop-cocks $f$, and of the vacuum in A by allowing any air brought in by leakage, or set free from the boiling wash, to escape, from time to time, into the atmosphere by closing $e$ and opening $d$ for a short while.

The manner of producing the continual overflow of the wash from one compartment to the other is shown clearly enough by the horizontal pipes $m$ $g$ and $o$, and the vertical pipes $u$ $p$ and $l$, the liquid in the vertical pipes standing always higher than in the compartment with which they communicate.

After the same principle, the spent wash will flow from A through $r$ into $s$, in which pipe $s$ the atmosphere, pressing at the surface of the wash in the well $t$, keeps the liquid to a height corresponding with the vacuum existing in A, say twenty-five feet for a vacuum of twenty-three inches mercury in A.

From the well $t$ the spent wash may flow off, or be pumped up by the ordinary means. Also, the finished spirit can be made to discharge into the atmosphere continuously by the overflow-pipe $r'$ and the vertical pipe $s'$, or it may be drawn periodically from the barrel G by opening and closing the appropriate stopcocks.

The pipes $r$ and $s$ and the well $t$ are, of course, not essential for the distillation *in vacuo*, as described, and may be left off in such cases, when no continuous discharge of the liquid is desired, as, for instance, in rectifying spirits. Besides, it will be apparent that the closed vessel A may also represent a plan for evaporating sirups or other fluids.

Having thus described my invention,

What I claim and desire to secure by Letters Patent, is—

The chamber F connected to the steam-pipe $w$, by means of the pipes $x$ and $b$, arranged substantially in the manner described, for the purpose set forth.

In testimony whereof I have hereunto set my hand and seal.

FREDERIC GUTZKOW. [L. S.]

Witnesses:
C. W. M. SMITH,
H. S. TIBBEY.